United States Patent [19]
Ho et al.

[11] Patent Number: 5,734,762
[45] Date of Patent: Mar. 31, 1998

[54] OPTICAL ISOLATOR SYSTEM AND METHOD

[75] Inventors: Ching Ho; Yue-Syan Jou, both of San Jose; Sunny K. Hsu, Sunnyvale; Nelson M. Shen, Palo Alto; Gengxin Li, Sunnyvale, all of Calif.

[73] Assignee: Qualop Systems Corporation, Sunnyvale, Calif.

[21] Appl. No.: 529,170

[22] Filed: Sep. 15, 1995

[51] Int. Cl.⁶ .................................................. G02B 6/27
[52] U.S. Cl. ...................... 385/11; 385/34; 385/27
[58] Field of Search ........................ 385/11, 15, 27, 385/34

[56] References Cited

U.S. PATENT DOCUMENTS

| | | | |
|---|---|---|---|
| 4,998,012 | 3/1991 | Kruse | 250/214 |
| 5,317,655 | 5/1994 | Pan | 385/11 |
| 5,446,813 | 8/1995 | Lee et al. | 385/31 |
| 5,546,486 | 8/1996 | Shih et al. | 385/31 |
| 5,557,692 | 9/1996 | Pan et al. | 385/11 |
| 5,594,821 | 1/1997 | Cheng | 385/27 |
| 5,631,771 | 5/1997 | Swan | 385/11 |

FOREIGN PATENT DOCUMENTS

| | | | |
|---|---|---|---|
| 2906104 | 8/1980 | Germany | 385/34 |
| 0021107 | 2/1991 | Japan | 385/34 |

OTHER PUBLICATIONS

Duncan T. Moore, "Gradient Index Optics", *Handbook of Optics, vol. II, Devices, Measurements, and Properties*, Optical Society of America, 1995, McGraw-Hill, Inc., pp. 9.1–9.10. [No Month].

Masataka Shirasaki and Kunihiko Asama, "Compact Optical Isolator for Fibers Using Birefringent Wedges", *Applied Optics*, vol. 21, No. 23, 1 Dec. 1982, pp. 4296–4299.

*Primary Examiner*—John D. Lee
*Assistant Examiner*—Ellen E. Kang
*Attorney, Agent, or Firm*—Robert P. Sabath; Edward B. Weller

[57] ABSTRACT

An optical isolator system and method improving the manufacturability of the system, including fabricating a unitary tubular optical isolator system in two parts which are soldered together. The tubular system includes an internal disk to protect the isolator from heated solder during joinder of containment portions. The optical isolator system includes tubes to space polarizer, analyzer, and isolator portions.

18 Claims, 7 Drawing Sheets

OPTICAL ISOLATOR SYSTEM AND METHOD

TECHNICAL FIELD OF THE INVENTION

This invention relates to systems and methods for isolating optical signals within an optical fiber system.

BACKGROUND

Optical isolators are key elements in fiber optic communications systems in which optical signals are produced by lasers. In a projected information highway system, for example, semiconductor lasers are employed in transmitters to produce forward directed optical signals. As is well-known, the optical signals produced by such lasers may carry information which may be in digital, analog, or combined format.

If the laser used in a transmitter is subject to undesired optical reflections, there are several adverse effects which will occur. These adverse effects include optical wavelength jitter, laser output intensity noise, and uncontrolled optical power modulations.

The uncontrolled optical power modulation produces a non-linear laser transfer function which represents the relationship between laser drive current and output optical power. This causes an infidelity representing the electrical signal (RF) with a distorted optical signal, which may cause errors in the operation of connected circuitry, such as decision making circuitry to misidentify an intended one state for a zero state. In the case of analog systems such as multi-channel television (TV) systems, non-linearity in the laser transfer function may cause interference between channels.

The laser output intensity noise induced with laser operation subject to undesired optical return, which degrades the TV signal to noise ratio and as a result reduces picture quality. An optical wavelength jitter transmitting in an optical fiber further produces TV signal distortion due to signal dispersion, as the optical signals propagate along the path of an optical fiber.

In the case of digital systems, information may be carried by bit symbols at a rate of 2.4 billion bits per second (i.e., Gb/s) or higher. At such rates, the bit to bit spacing becomes progressively more limited. As optical signal bits progress along the length of an optical fiber, the bits are subject to dispersion, which reduces the signal level of the bits. The reduced signal level results in an increased bit error rate. Signal dispersion causes a spreading of the signal and results in bit overlap. The overlapping of bits in turn causes a high bit error rate and reduces fidelity in the transmission of information.

Accordingly, it is desirable to block the reverse or return transmission of optical signals back to a laser transmitter while providing low attenuation at the forward direction.

Further, it is desirable to reduce undesired levels of reflected optical power in optical systems operating in communications systems and in the information super highway.

It is desirable to produce cost effective optical isolators which reduce reflected optical power in fiber optical systems.

Optical isolators are used with fiber optic amplifiers in optical systems to prevent oscillation due to reflection and to prevent injection of spontaneous optical emissions to the laser transmitter originally producing the optical signals. Optical interference noise effects such as the spontaneous emissions can occur at a reflection level of, one part per million (i.e., below 60 dB) of light. The interference noise will increase transmission noise of the fiber optic transmission system resulting in reducing signal to noise ratio and signal distortion.

U.S. Pat. No. 5,317,655 granted in 1994 to Jing-Jong Pan and assigned to E-Tek Dynamics, Inc., shows an optical isolator having an input optical fiber, a first GRIN lens, a first polarizer, an optical rotator, a second polarizer as an analyzer, a second GRIN lens, and an output optical fiber. The input optical fiber is connected to a window element formed by a thin pane of glass. The glass is coated with an anti-reflection material. The thickness of the anti-reflection material can be tested on the pane to determine if the coating is satisfactory. When the coating is satisfactory, the pane is diced into tiny windows. One of the windows is mounted over the end of the fiber on the slant faced end of the glass ferrule. This process of window manufacture and placement is complicated and expensive.

SUMMARY OF THE INVENTION

According to the present invention, unwanted levels of reverse directed optical signal power are suppressed in an arrangement of an optical isolator system comprising a tubular containment holding in spaced axial arrangement an (1) optical collimator axially spaced from an (2) optical isolation assembly in turn axially spaced from an (3) optical collector, each of them respectively mounted within the tubular containment. The optical collimator according to the present invention includes a fiber mounting assembly and a graded index lens (i.e., a GRIN lens). The fiber mounting assembly includes an outwardly surface angled capillary and an input optical fiber. The input optical fiber and the outwardly surface angled capillary are similarly outwardly surface angled along a coincident plane. According to the present invention, the joint planar angled surfaces of the input optical fiber and the outwardly surface angled capillary include a jointly deposited antireflective layers fabricated directly on their jointly shared epitaxial surface. The capillary centrally axially supports the input optical fiber. The GRIN lens is axially spaced from the fiber mounting assembly.

The optical isolation assembly according to the present invention includes first and second polarizers, an optical rotator secured in spaced axial arrangement between the first and second polarizer. According to an embodiment of the present invention, first and second masking rings axially space the respective first and second polarizers from the optical rotator. According to one embodiment of the present invention, each of the first and second polarizers is a wedge polarizer in which the input and output surfaces of each wedge polarizer are not so parallel that they introduce interference patterns between input and output surfaces.

The optical collector according to the present invention in turn includes a fiber mounting assembly and a GRIN lens. The fiber mounting assembly includes an inwardly surface angled capillary and an output optical fiber. The output optical fiber and the inwardly surface angled capillary are similarly inwardly surface angled along a coincident plane. According to the present invention, the joint planar angled surfaces of the output optical fiber and the inwardly surface angled capillary include a jointly deposited antireflective layer fabricated directly on their jointly shared epitaxial surface. The capillary centrally axially supports the output optical fiber. The GRIN lens is axially spaced inwardly from the fiber mounting assembly.

According to one embodiment of the present invention, a low attenuation optical isolator eliminates transmission of reversely directed optical signals in an optical waveguide such as for example an optical conductor or optical fiber.

DETAILED DESCRIPTION OF THE INVENTION

Figure 1A:
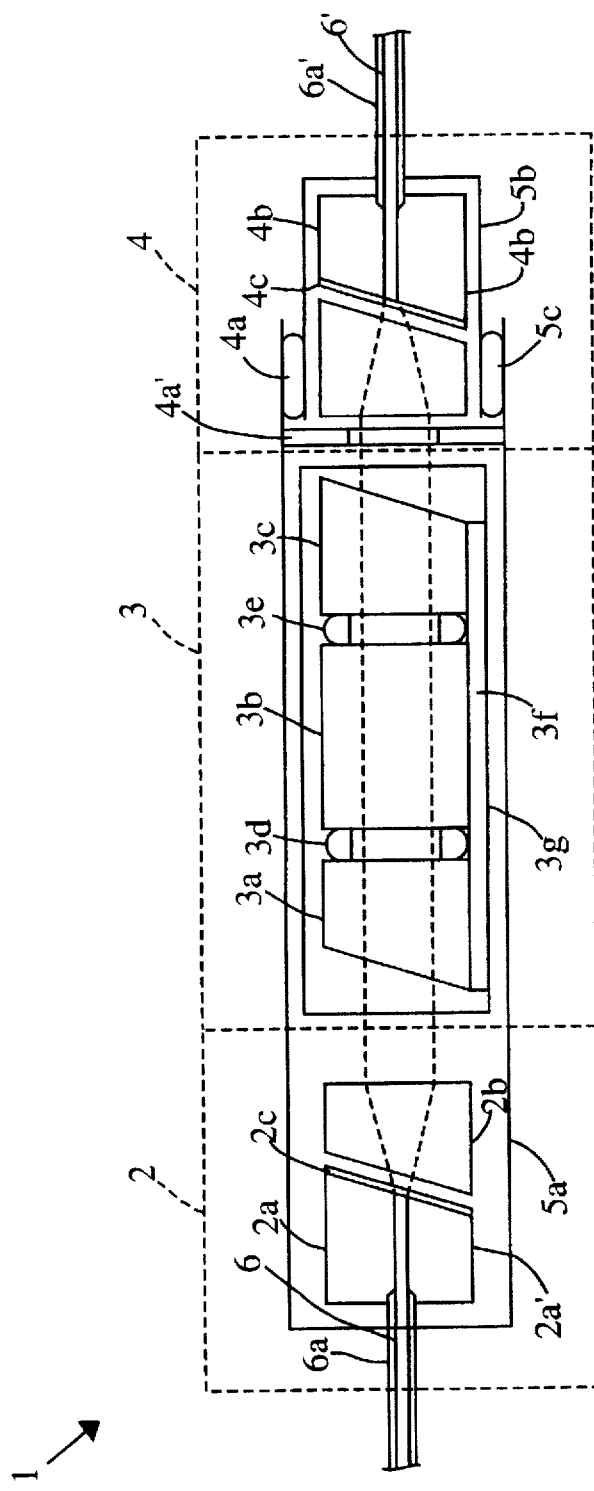
FIG. 1a is a side schematic drawing of an optical isolator system according to the present invention.

FIG. 1 a is a side schematic drawing of an optical isolator system 1 according to the present invention. The optical isolator system according to the present invention includes an optical collimator 2, an optical isolation assembly 3, and an optical collector 4 (or optical condenser). Optical collimator 2, optical isolation assembly 3, and optical collector 4 are held in spaced axial relationship to each other. Optical isolator system 1 according to the present invention includes a tubular containment 5 as will be described in greater detail below with reference to FIGS. 2 and 3.

More particularly, optical collimator 2 is axially spaced from optical isolation assembly 3, which in turn is axially spaced from optical collector 4, and each of them respectively mounted within tubular containment 5 to be discussed in connection with FIGS. 2 and 3. For operation, optical isolation assembly 3 is spaced at an optimized location between optical collimator 2 and optical collector 4 at which optical beams between collimator 2 and collector 4 are substantially parallel. As shown in FIG. 4, the positioning of collimator 2, isolation assembly 3, and collector 4 can be fixed axially and transversely within containment 5 by the use of set screws, as discussed in detail below.

Optical collimator 2 according to the present invention includes a fiber mounting assembly 2a' and a graded index lens (i.e., a GRIN lens) 2b. Fiber mounting assembly 2a' includes an outwardly surface angled capillary 2a and an input optical fiber 6 having buffer coating 6a. GRIN lens 2b has a 0.23 pitch according to one embodiment of the present invention. Buffer coating 6a is partially removed from optical fiber 6 for insertion into capillary 2a during assembly.

The relationship between optical collimator 2, optical isolation assembly 3, and optical collector 4 in optical isolator system 1 permits the receipt of optical signals on input optical fiber 6, as discussed in detail below. According to the present invention, the construction of optical isolator system 1 permits the expansion of the optical signals between fiber mounting assembly 2a' and GRIN lens 4a, transmission of the optical signals in a forward direction through optical isolation assembly 3 while blocking reverse transmission, contraction of the optical signals in optical collector 4, and departure of the recontracted optical signals in an output optical fiber 6'. One of the functions of optical collimator 2 is to produce a collimated beam of optical signals for isolation assembly 3 to perform its isolation function, as discussed in greater detail below.

Input optical fiber 6 and outwardly surface angled capillary 2a are similarly outwardly surface angled along a coincident plane. According to the present invention, the joint planar angled surfaces of input optical fiber 6 and outwardly surface angled capillary 2a include a jointly deposited antireflective layer or layers 2c fabricated directly on their jointly shared epitaxial surface. Deposition of one or more antireflective layers is accomplished with well known materials to quarter wavelength thicknesses according to well known thick film techniques. Capillary 2a centrally axially supports input optical fiber 6 along its central axis. According to one embodiment of the present invention, fiber 6 is secured in epoxy inserted within the center of capillary 2a. The epoxy is then cured, to secure fiber 6 within capillary 2a at a desired axial position within capillary 2a. GRIN lens 2b is axially spaced from the fiber mounting assembly 2a'. In optical collimator 2, fiber 6 is embedded along the axis of capillary 2a. A selected input end of fiber 6 is flushed with an end of capillary 2a, for example, by sanding and polishing operation to ensure a desired common angle of the joint angled surfaces of capillary 2a and fiber 6. According to one embodiment of the present invention, the angle from the normal to the direction of optical progress is approximately eight (8) degrees. According to one embodiment of the present invention, selected ends of fiber 6 and capillary 2a are secured with respect to each other, by epoxy for example. GRIN lens 2b includes first and second ends, both of which are anti-reflection coated.

The selected end of fiber 6 and capillary 2a is ground or otherwise slanted to an angle of approximately eight (8) degrees, according to one embodiment of the present invention. The selected angle ensures that reflected light is not coupled back and through transmission disturbance is minimized as a function of the optical beam profile. The angle selected prevents reflection of optical power back to input fiber 6. Other surface end angles can be substituted and are workable within the scope of the present invention.

Figure 1B:
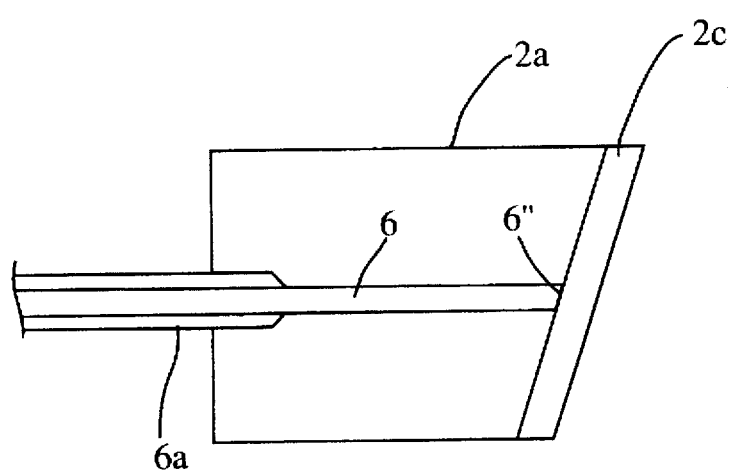
FIG. 1b is a side schematic drawing of an input optical fiber and outwardly surface angled capillary in the optical collimator of optical isolator system according to the present invention.

As shown in FIG. 1b, the slanted ends of fiber 6 and capillary 2a are further deposited with one or more selected antireflective layers directly on their conjoined angle surfaces by deposition of selected layer materials. The antireflective layer or layers improve optical transmission characteristics of the system and reduce unwanted reflected optical power. An optimized pitch grade index lens is used to collimate the optical power exiting from optical fiber 6. The antireflective layer or layers may be for example one or two layers of $ZrO_2.SiO_2$ or $ThF_2SiO_2$. This material can be deposited by well-known sputter techniques using an electron gun to conduct the sputter deposition, for example. Such an operation can be commissioned from Thinfilm Technology, Inc., of Fullerton, Calif., for example.

According to the present invention, the use of antireflective coatings improves optical throughput considerably, particularly in comparison with the practice of cementing anti-reflection slabs at a fiber end, which results in reduced optical power handling capabilities. For example, an optical cement has been shown to degrade in 30 days with 300 mW of optical power radiation at 1550 nm. Optical reflection is additionally eliminated and optical throughput is improved by elimination of two slabs of cement interfaces.

Optical isolation assembly 3 according to the present invention includes a polarizer 3a, an optical rotator 3b, and a polarization analyzer 3c secured in spaced axial arrangement between polarizer 3a and polarization analyzer 3c. Optical isolation assembly 3 additionally includes a tubular permanent magnet within which polarizer 3a, optical rotator 3b, and polarization analyzer 3c are axially mounted, and as will be discussed in greater detail below in connection with FIG. 4. Additionally, optical isolation assembly 3 is mounted within tubular containment 5, as illustrated in FIGS. 2 and 3.

Polarizer 3a is, for example, a birefringent crystal wedge such as YvO4. Polarization analyzer 3c is also a birefringent crystal wedge, according to one embodiment of the present invention.

Optical rotator 3b is a Faraday rotator according to an embodiment of the present invention. More particularly, optical rotator 3b is formed from $(BiYbTb)3Fe_5O_{12}$. In operation, input rays are received from optical collimator 2. The polarization angle of incident rays are rotated 45 degrees with respect to the polarization angle of the incoming beam from collimator 2. The rotational adjustment of polarization analyzer 3c is set to transmit polarized rays which have been rotated by optical rotator 3b. After transmission through polarization analyzer 3c, the rays are collected by optical collector 4 and couples into output optical fiber 6'.

The entry side surface of polarizer 3a is angled at approximately 74 degrees from the direction of forward propagation for optical signals being transmitted, according to one embodiment of the present invention. A parallel input beam to optical isolation assembly 3 enters polarizer 3a of optical isolation assembly 3 and is polarized and separated into two rays of light. One of the rays is polarized along the crystal axis of the birefringent polarizer, the other is polarized perpendicularly to the crystal optical axis extraordinary ray. The optical rotator 3b rotates in received light from polarizer 3a by 45 degrees with respect to the optical axis of polarizer 3a. The polarization analyzer is aligned in a way that receives the ordinary and the extraordinary rays and recombines them.

According to an embodiment of the present invention, optical isolation assembly 3 further includes first and second masking rings, 3d and 3e axially spacing respective polarizer 3a and polarization analyzer 3c from optical rotator 3b. According to one embodiment of the present invention, each of polarizer 3a and polarization analyzer 3c is a wedge polarizer in which the input and output surfaces of each are substantially non-parallel.

The use of masking rings 3d and 3e resolves a difficulty during assembly of the optical isolator. As shown in FIG. 4, the elements of the optical isolator are fabricated at selected axial positions on a selected slab 3f of aluminum, for example. The elements are fixed at selected locations on the slab with a selected epoxy or adhesive. Slab 3f is thereafter inserted within the tubular magnet 3g and within the containment of the optical isolator. The adhesive may unfortunately run into gaps between polarizer 3a and optical rotator 3b, or optical rotator 3b and polarization analyzer 3c. The entry of adhesive onto the optically active surfaces of optical rotator 3b, polarizer 3a, or polarization analyzer 3c seriously degrades its operation and performance. For example, interference patterns would be caused by reflections from the surfaces of polarizer 3a, polarization analyzer 3c, or the surface of optical rotator 3b, thereby downgrading the performance of optical isolator system 1. Accordingly, masking rings 3d and 3e are positioned respectively between polarizer 3a and optical rotator 3b, and optical rotator 3b and polarization analyzer 3c, the masking rings 3d and 3e are approximately 75 micrometers thick, have an inner diameter of 1 mm and a 2 mm outside diameter, as spacers between the polarizers and optical rotator 3b. Rings 3d and 3e prevent adhesive runs into the optical path between polarizer 3a and optical rotator 3b, and optical rotator 3b and polarization analyzer 3c. Rings 3d and 3e protect the inner surfaces between polarizer 3a and optical rotator 3b, and optical rotator 3b and polarization analyzer 3c and accordingly prevent interference due to reflections from the surfaces of between polarizer 3a and optical rotator 3b, and optical rotator 3b and polarization analyzer 3c due to damage caused by the adhesive material. Finally, use of rings 3d and 3e as structural elements bearing against adjacent surfaces of polarizer 3a and optical rotator 3b, and optical rotator 3b and polarization analyzer 3c provides additional structural strength and robustness for the entire optical isolator system 1, according to the present invention.

According to one embodiment of the present invention, polarizer 3a and polarization analyzer 3c are each wedged at approximately sixteen (16) degrees, and further each is deposited with a selected anti-reflection coating to reduce returned optical reception and to improve forward transmission of optical signals. As noted above, first and second masking rings 3d and 3e provide mechanical strength for improved stability, as well as improving optical isolation and reducing through-put losses.

According to one embodiment of the present invention, a thin shim can be employed to rotate second polarizer 3c about the longitudinal axis to permit correction of the rotation of the optical rotator (i.e., second polarizer 3c) and to improve optical throughput and optical isolation.

Optical collector 4 (i.e., condenser) according to the present invention includes a fiber mounting assembly 4b' and a GRIN lens 4a. The optical condenser is a reciprocal of optical collimator 2. Optical collector 4 collects light from optical isolator 3 and focuses it toward an input end of output fiber 6'. Fiber mounting assembly 4b' further includes an inwardly surface angled capillary 4b and an output optical fiber 6'. Output optical fiber 6' and inwardly surface angled capillary 4b are similarly inwardly surface angled along a coincident plane. According to the present invention, the joint planar angled surfaces of output optical fiber 6' and inwardly surface angled capillary 4b' include a jointly deposited antireflective layer fabricated directly on their jointly shared epitaxial surface. Capillary 4b centrally axially supports output optical fiber 6'. GRIN lens 4a is axially spaced inwardly from fiber mounting assembly 4b'.

In optical collimator, i.e., condenser, 4, fiber 6' is embedded along the axis of capillary 4b. The condenser collects light from the isolator and focuses it into output fiber 6'. In the reverse direction, the condenser becomes a collimator. The angled, anti-reflection coated fiber end also is a high return loss to the output fiber. The polarization analyzer becomes a polarizer. The collimated ray from the condenser is also polarized and spilled into ordinary ray and extraordinary ray. The rays are then rotated by the Faraday rotator by 45 degrees. The rotation is in the opposite direction with respect to the rotation for the rays which come from the collimator. As a result, the ordinary ray is swapped from the extraordinary ray. The rays can not be combines and can not be focused by the collimator into input fiber 6.

A selected end of fiber 6' is flushed with an end of capillary 4b', for example, by fine sanding and polishing operation to ensure a desided common angle of the joint angled surfaces of capillary 4b and fiber 6'. According to one embodiment of the present invention, selected ends of fiber 6' and capillary 4b' are secured with respect to each other, by epoxy for example. Then the selected end is ground or otherwise slanted to an angle of approximately eight (8) degrees. According to another embodiment the angle of slant is less than approximately eight (8) degrees. The angle selected prevents reflection of optical power back to output fiber 6'. Other surface end angles can be substituted and are workable within the scope of the present invention. The slanted end is further deposited with one or more selected antireflective layers directly on the conjoined angle surfaces by deposition of the layer materials. The antireflective layer or layers improve optical transmission characteristics of the system and reduce unwanted reflected optical power. An optimized pitch grade index lens is used to condense the optical power exiting from optical isolator 3 into output optical fiber 6'.

According to one embodiment of the present invention, the optical isolator system effectively transmits incoming optical signals from input optical fiber 6 to outgoing optical fiber 6', while blocking light originating from outgoing optical fiber 6' back into input optical fiber 6.

Optical collimator 2 according to the present invention is assembled by aligning inserting optical fiber 6 and fiber holder assembly 4b through an axial aperture on one end of tubular containment 5. Fiber mounting assembly is then aligned with GRIN lens 2b and secured within the containment tube. A desired alignment occurs when light comes from input fiber 6 and exits GRIN lens 2b in a parallel beam.

Optical collimator 2 according to the present invention includes a fiber mounting assembly 2a' and a graded index lens (i.e., a GRIN lens) 2b. Fiber mounting assembly 2a' includes an outwardly surface angled capillary 2a and an input optical fiber 6. GRIN lens 2b has a 0.23 pitch according to one embodiment of the present invention.

According to one embodiment of the present invention, use of an anti-reflective coating on the angled surface of the optical isolator system improves optical signal throughput and reduces optical reflection significantly. The resulting return loss from a coated and angled isolator is on the order of 70 dB.

Thus, according to one embodiment of the present invention, a low attenuation optical isolator eliminates transmission of reversely directed optical signals in an optical waveguide such as for example an optical conductor or optical fiber.

According to the method of the present invention, the polarizer is assembled within a magnetic tube, and the polarization analyzer is assembled to the magnetic tube to form an optical isolator system. A shim is included in the assembly to permit counterrotating adjustment about the axis of the optical isolator, to accomplish tuning, to improve isolation, and to improve throughput. By inserting a shim between the Faraday rotator and the polarization analyzer, for example, assembly adjustments are enabled which increase manufacturing yield.

Further, input fiber 6 is assembled with an input fiber holder, e.g., capillary, an input GRIN lens in a first end of a first portion of a tubular containment to secure optical collimator 2. Next, optical isolator is inserted into the remaining space, i.e., the second end of the first portion of the tubular containment. Next, output fiber 6' is assembled with output capillary and output GRIN lens in a second portion of tubular containment. Finally, first and second tubular containment portions are secured together, for example by annular soldering. According to one embodiment of the present invention, the leading edges of the capillary are chamfered off to prevent scraping during assembly against the interior of containment tube portions.

Figure 2:
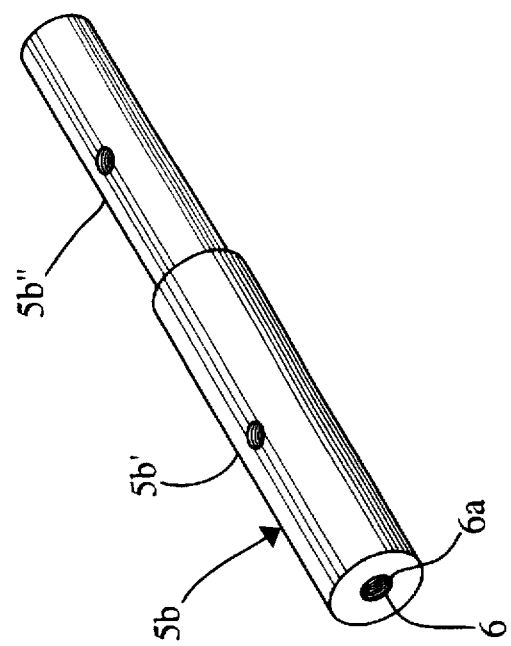
FIG. 2 is an isometric drawing of a first portion of a containment structure for the optical isolator system, according to the present invention.

FIG. 2 is an isometric drawing of a first portion 5b of containment structure 5 for the optical isolator system, according to the present invention. In particular, FIG. 2 shows fiber 6 and its buffer 6a inserted into a receiving aperture at the end of first portion 5b of containment structure 5. First portion 5a includes first and second subportions 5b' and 5b" respectively having large and small outer diameters. Second subportion 5b" is insertable into a receiving aperture in second portion 5a of containment structure 5, and subject to being soldered in place during manufacturing assembly, according to the present invention, as will be seen.

Figure 3:
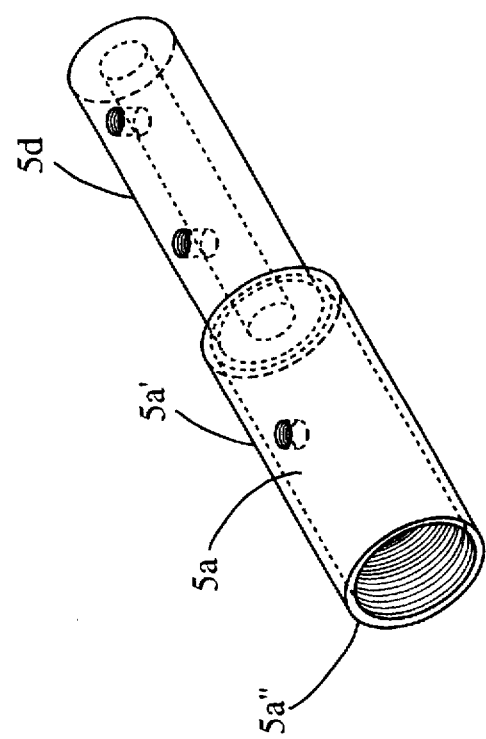
FIG. 3 is an isometric drawing of a second portion of a containment structure for the optical isolator system which is secured into an axial receiving structure of the first portion of the containment structure during assembly, according to the present invention.
Figure 4:
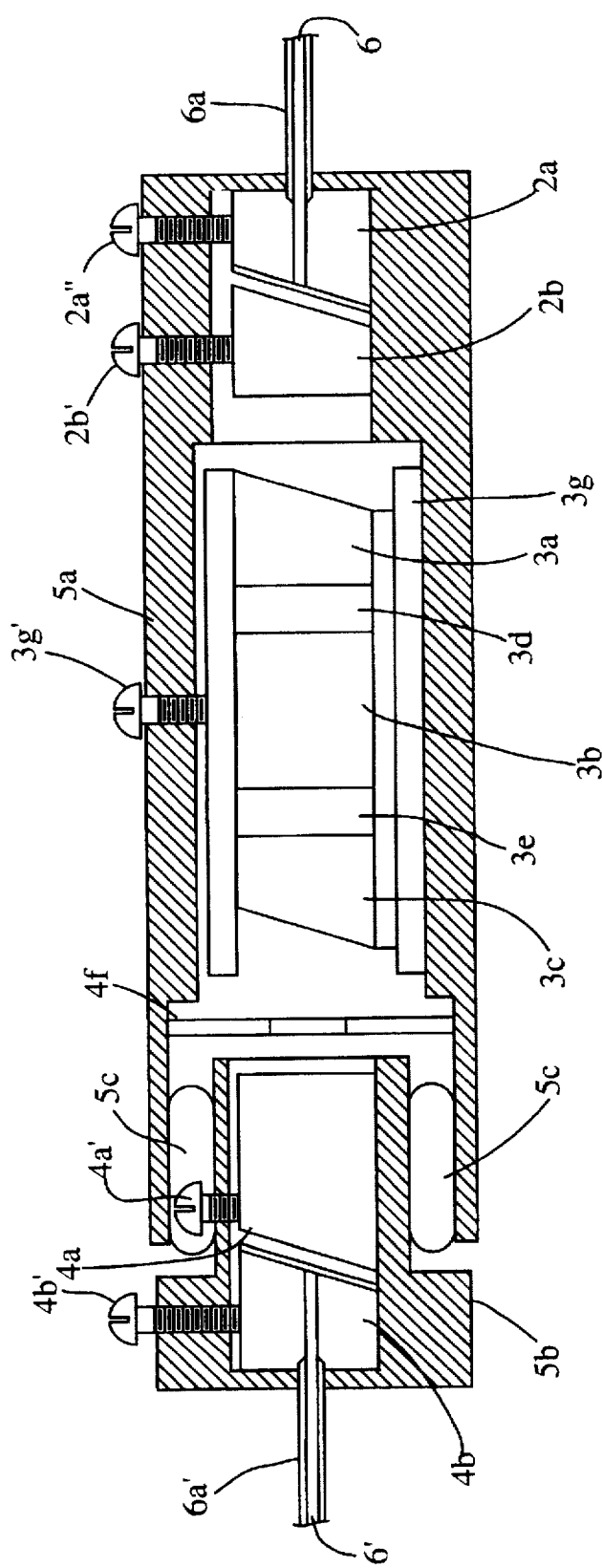
FIG. 4 is a side cross sectional view of an optical isolator system according to the present invention.

FIG. 3 is an isometric drawing of a second portion 5a of containment structure 5 for optical isolator system 1 which is secured into an axial receiving structure of the first portion of the containment structure during assembly, according to the present invention. Second portion 5a includes first and second subportions 5a" and 5a' respectively having large and small inner diameters respectively conforming with first and second subportions 5b" and 5b' to permit insertion of subportion 5b" fittingly into subportion 5a' and at least a portion of subportion 5b' into subportion 5d". Second portion 5b of containment structure 5 can be soldered in place with first portion 5a of containment structure 5 during manufacturing assembly, according to the present invention, to produce a workable optical isolation system. When first and second portions 5a and 5b are manufactured, they are soldered together at the part of subportion 5b" which is inserted into subportion 5a" of containment structure 5.

FIG. 4 is a side cross sectional view of optical isolator system 1 according to the present invention. In particular, FIG. 4 shows first and second overlapping tubular flanges of respective first and second portions 5a and 5b of containment structure 5. Portions 5a and 5b are soldered together with solder 5c. Optical isolator system 1 includes a disk 4f. A central axial opening permits axial traversal of optical signals without obstruction and presents a direct obstacle to solder being applied during manufacture to secure first and second portions 5a and 5b of containment structure 5 with respect to each other. Thus, any solder flux splashed in the direction of optical components, particularly those within optical isolator assembly 3 is prevented from reaching these sensitive structures within optical isolator system 1.

As shown in FIG. 4, containment 5 defines five threaded radial apertures permitting set screws to secure corresponding optical components at selected locations within containment 5.

In particular, set screw 4b' secures fiber mounting assembly 4b against the inner diameter of first containment portion 5b. Further, set screw 4a' secures GRIN lens 4a against the inner diameter of first containment portion 5b.

Additionally, set screw 3g' secures optical isolator assembly 3 within the inner diameter of first containment portion 5a at a selected axial location. Additionally, set screw 2a" secures fiber mounting assembly 2a against the inner diameter of first containment portion 5a. Further, set screw 2b' secures GRIN lens 2b against the inner diameter of first containment portion 5b.

Manufacturing yield has increased substantially using the approach of the present invention.

Figure 5:
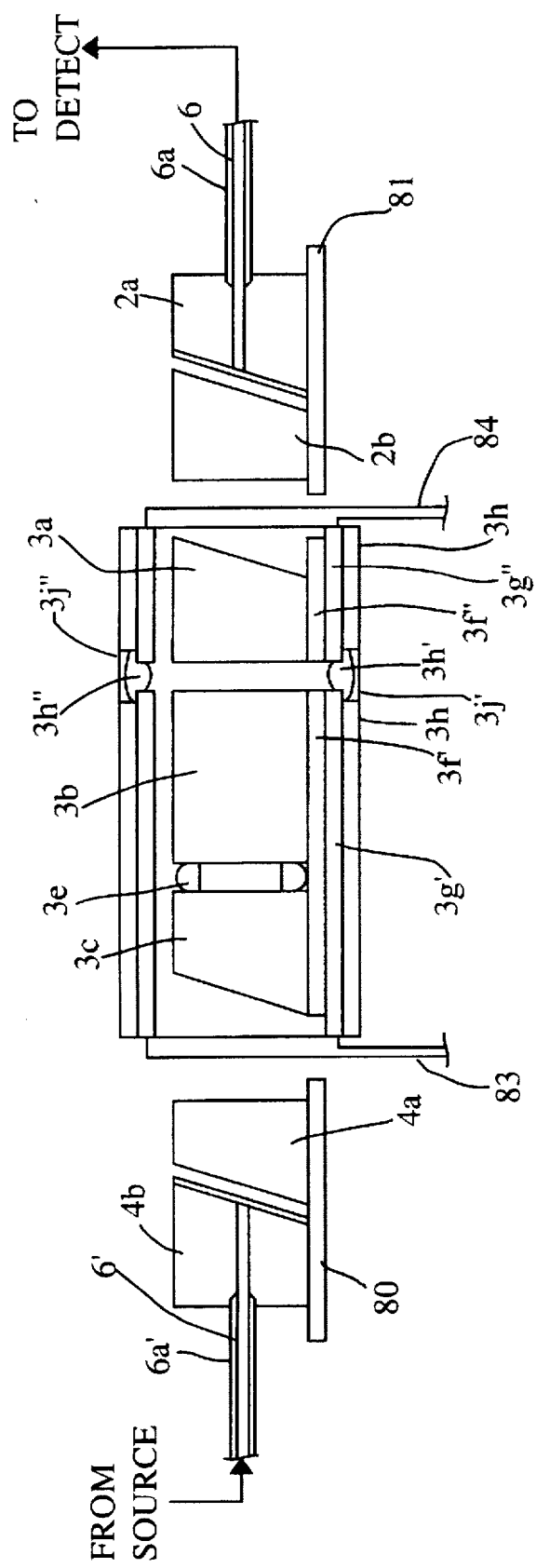
FIG. 5 is a side cross sectional view of an optical isolator system according to the present invention, illustrating separation of polarization analyzer from the optical rotator during fabrication to permit testing and measurement of insertion loss and optical isolation.

FIG. 5 is a side cross sectional view of an optical isolator system according to the present invention, illustrating separation of polarization analyzer 3a from the optical rotator 3b during fabrication to permit testing and measurement of insertion loss and optical isolation. For such measurement, the optical isolation assembly according to the present invention includes a polarizer 3a, an optical rotator 3b, and a polarization analyzer 3c secured in spaced axial arrangement between polarizer 3a and polarization analyzer 3c. The optical isolation assembly additionally includes a two-part tubular permanent magnet within which polarizer 3a, optical rotator 3b, and polarization analyzer 3c are axially mounted. Additionally, optical isolation assembly 3 is mounted within a tubular containment 3h.

Optical rotator 3b is a Faraday rotator according to an embodiment of the present invention. More particularly, optical rotator 3b is formed from $(BiYbTb)3Fe_5O_{12}$. In operation, input rays are received from optical collimator 2. The polarization angle of incident rays are rotated 45 degrees with respect to the polarization angle of the incoming beam from collimator 2. The rotational adjustment of polarization analyzer 3c is set to transmit polarized rays which have been rotated by optical rotator 3b. After transmission through polarization analyzer 3c, the rays are collected by optical collector 4 and couples into output optical fiber 6'.

According to an embodiment of the present invention, optical isolation assembly 3 further includes a masking ring 3e axially spacing polarization analyzer 3c from optical rotator 3b. According to one embodiment of the present invention, polarization analyzer 3c is a wedge polarizer. The use of masking ring 3e resolves a difficulty during assembly of the optical isolator. The elements of the optical isolator are fabricated at selected axial positions on a selected slabs 3f' and 3f" and made of aluminum, for example. The elements are fixed at selected locations on the slab with a selected epoxy or adhesive, with polarization collimator 3a being mounted on slab 3f", and. Slabs 3f and 3f" are thereafter inserted within respective tubular magnets 3q' and 3q" and within the containment of the optical isolator.

As shown in FIG. 5, external jacket 3h is provided to secure respective tubular magnets 3g' and 3g" with use of epoxy 3h' and 3h" in respective holes 3q' and 3q". Respective tubular magnets 3g' and 3g" are additionally held in counter rotational stability by attachment to respective fixtures 83 and 84 which can be rotationally adjusted. Once an optimal or desired level of insertion loss and isolation has been achieved for a particular wavelength, the counter rotational setting of respective tubular magnets 3g' and 3g" is fixed by epoxy.

FIG. 5 further shows fiber mounting assembly 2a' and a graded index lens (i.e., a GRIN lens) 2b. Fiber mounting assembly 2a includes an outwardly surface angled capillary 2a and an input optical fiber 6 having buffer coating 6a. Buffer coating 6a is partially removed from optical fiber 6 for insertion into capillary 2a during assembly. FIG. 5 further shows fiber mounting assembly 4a and a graded index lens (i.e., a GRIN lens) 4a. Surface angled capillary 4b and an input optical fiber 6' having buffer coating 6a'. Buffer coating 6a' is partially removed from optical fiber 6'. For testing incident to manufacture, light from a suitable source such as a laser is provided in successive evolutions to fiber 6' and fiber 6. Correspondingly, light is detected at fiber 6 and fiber 6'.

Figure 6:
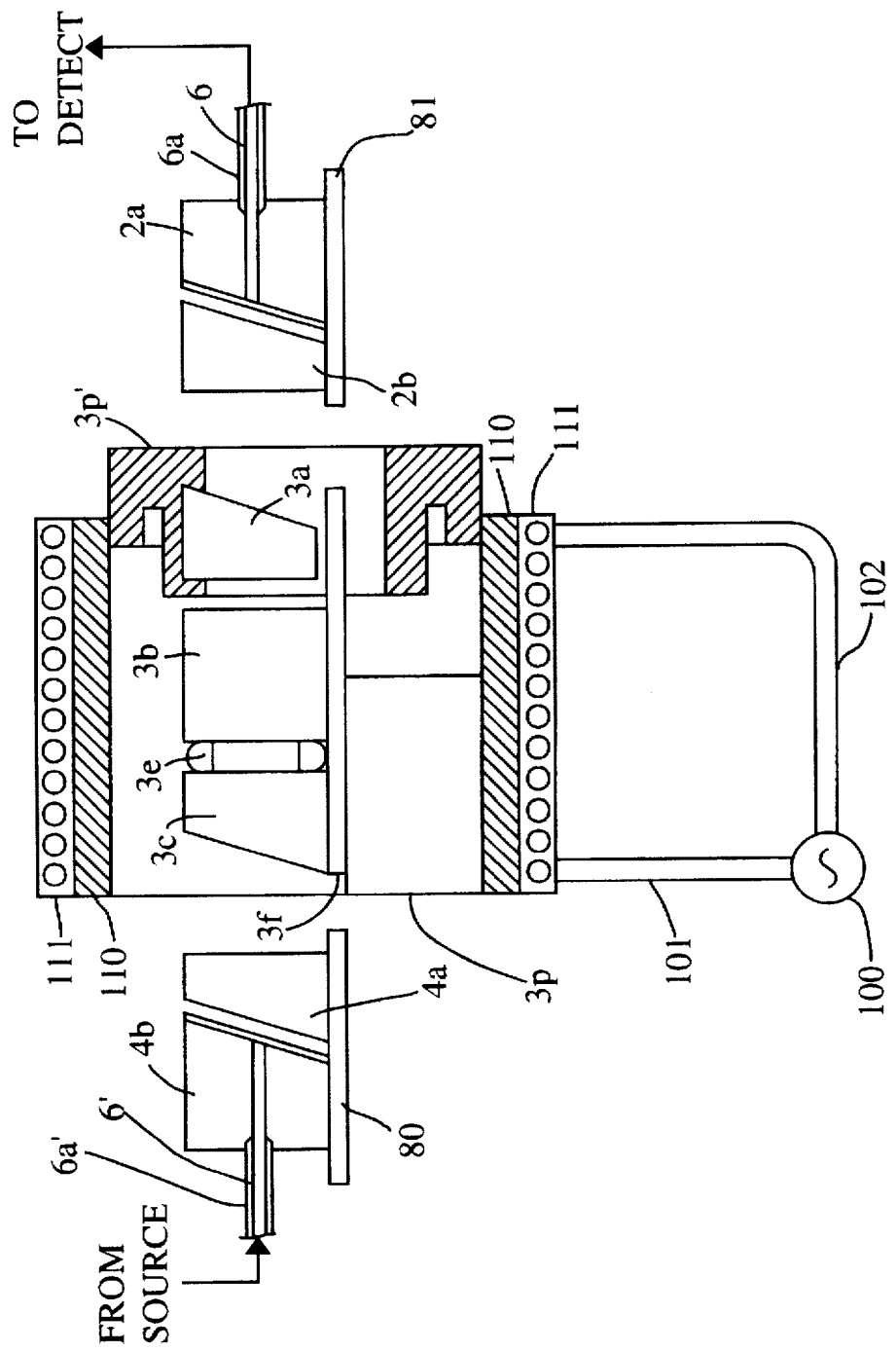
FIG. 6 is a side cross sectional view of an optical isolator system according to the present invention, illustrating separation of polarization analyzer from the optical rotator during fabrication to permit testing and measurement of insertion loss and optical isolation with an electromagnet.

FIG. 6 is a side cross sectional view of an optical isolator system according to the present invention, illustrating separation of polarization analyzer from the optical rotator during fabrication to permit testing and measurement of insertion loss and optical isolation with an electromagnet. Polarizer 3a, optical rotator 3b, and polarization analyzer 3c secured in spaced axial arrangement between polarizer 3a and polarization analyzer 3c. A tubular electromagnet 111 is supported by a tubular support 110 within which polarizer 3a, optical rotator 3b, and polarization analyzer 3c are axially mounted. Optical rotator 3b and polarization analyzer 3c are supported by slab 3f which in turn is supported by fixture 3p in turn mounted within tubular support 110. Tubular electromagnet is provided with reversible polarity electric power, to permit measurement of insertion loss and isolation without having to shift power meter and light source to measure light is both directions. Polarizer 3a is additionally held in rotatable fixture 3p' which fits within the edge of tubular support 110. Tubular electromagnet 111 is provided with power along electric lines 101 and 100. By reversing the magnet, insertion loss and isolation can be measured in the other direction.

What is claimed is:

1. An optical isolator system, including:
   a collimator including
   an input fiber with an exposed face angled in construction to avoid reverse reflection of optical signals initially directed in a first selected direction of an optical path,
   a fiber holder having an output face planar coincident with the exposed face of the input fiber, said collimator including a non-reflective coating fabricated epitaxially on the joint coincident faces of said input fiber and fiber holder, and
   a GRIN lens axially offset from said input fiber; an isolator including
   a polarizer,
   a rotator coaxial with and axially offset from said polarizer, and
   a polarization analyzer axially offset from said rotator; and
   a condenser including
   an output fiber with an exposed face angled in construction to avoid reverse reflection of optical signals initially directed in a selected direction of an optical path.
   a fiber holder having an input face planar coincident with the exposed face of the output fiber, said condenser including a non-reflective coating fabricated epitaxially on the joint coincident faces of said output fiber and fiber holder, and
   a GRIN lens axially offset from said output fiber; and
   a containment for axially securing said collimator, said isolator, and said condenser, and further includes a disk positioned axially between said isolator and said condenser and having an opening for passing optical signals from the isolator to the condenser.

2. The optical isolator system of claim 1 including a containment for axially securing said collimator, said isolator, and said condenser.

3. The optical isolator system according to claim 2 wherein said containment includes first and second portions which overlap in part to form an enclosure.

4. The optical isolator system according to claim 3 wherein said first and second portions are tubular.

5. The optical isolator system according to claim 4 wherein said first and second portions are soldered together.

6. The optical isolator system of claim 1, 
   wherein said containment includes first and second portions which overlap in part to form an enclosure, said first and second portions are soldered together, and said disk prevents said solder from contacting said isolator.

7. The optical isolator system of claim 1 wherein the rotator comprises $(BiYbTb)3Fe_5O_{12}$.

8. A method of assembling an optical isolator system including a collimator, an isolator, and a condenser, in a two part tubular containment, the isolator including a polarizer, a rotator, and a polarization analyzer, comprising:

fabricating epitaxially a non-reflective coating on faces of the collimator;

securing said collimator and isolator at respective first and second locations of a selected first portion of said two part tubular containment, securing said isolator including securing the polarizer, the rotator, and the polarization analyzer axially offset from each other at the second location of the selected first portion;

securing said condenser in said second portion of said two part tubular containment; and axially securing said first and second two parts of said tubular containment to each other to form an enclosure, wherein said tubular containment further includes a disk positioned axially between said isolator and said condenser and having an opening for passing optical signals from the isolator to the condenser.

9. The method of claim 8 including soldering said first and second two parts of said tubular containment to each other to form an enclosure.

10. The method of claim 9 including protecting said isolator from solder during soldering.

11. An optical isolator system, including:

a containment having first and second axial openings for connecting input and output optical fibers;

a collimator mounted in said containment including an input fiber with an exposed face angled in construction to avoid reverse reflection of optical signals initially directed in a first selected direction of an optical path.

a fiber holder having an output face planar coincident with the exposed face of the input fiber, said collimator including a non-reflective coating deposited epitaxially on the joint coincident faces of said input fiber and said fiber holder, and a GRIN lens axially offset from said input fiber;

an isolator mounted in said containment including a polarizer, a rotator coaxial with and axially offset from said polarizer, and a polarization analyzer axially offset from said rotator; and a condenser mounted in said containment for receiving forward directed optical signals from said isolator; and a containment for axially securing said collimator, said isolator, and said condenser, and further includes a disk positioned axially between said isolator and said condenser and having an opening for passing optical signals from the isolator to the condenser.

12. An optical isolator system according to claim 11, said containment further including first and second tubular portions respectively including first and second flanges which overlap with each other.

13. An optical isolator system according to claim 12 further including a physical structure separating said isolator and said first and second flanges.

14. An optical isolator system according to claim 13 wherein said physical structure is annular.

15. An optical isolator system according to claim 13 wherein said first and second flanges are connected by solder.

16. An optical isolator system, including:

a collimator including an input fiber with an exposed face angled in construction to avoid reverse reflection of optical signals initially directed in a first selected direction of an optical path, a fiber holder having an output face planar coincident with the exposed face of the input fiber, and a GRIN lens axially offset from said input fiber;

an isolator including a polarizer, a rotator coaxial with and axially offset from said polarizer, a polarization analyzer axially offset from said rotator, and a permanent magnet in first and second axially offset portions, said polarizer being mounted in said first portion, and said polarization analyzer being mounted in said second portion;

a condenser including an output fiber with an exposed face angled in construction to avoid reverse reflection of optical signals initially directed in a selected direction of an optical path.

a fiber holder having an input face planar coincident with the exposed face of the output fiber, and a GRIN lens axially offset from said output fiber; and a containment for axially securing said collimator, said isolator, and said condenser, and further includes a disk positioned axially between said isolator and said condenser and having an opening for passing optical signals from the isolator to the condenser.

17. A method of fabricating an optical system having a polarizer, an optical rotator, and a polarization analyzer, including:

axially aligning in ordered sequence a polarizer, an optical rotator, and a polarization analyzer, each axially offset from each other establishing magnetic operating conditions to said optical rotator to enable said optical system to permit optical transmission in one optical direction and to prevent optical transmission through said optical system in the opposite axial direction, applying light from a laser light source to said polarizer in an axial direction and passing said light through said polarizer, said optical isolator, and said polarization analyzer, measuring the level of light transmitted from said polarization analyzer, and adjusting said polarization and polarization analyzers with respect to optical insertion loss and isolation, wherein said optical system further includes a first ring positioned axially between said rotator and said polarizer, and a second ring positioned axially between said rotator and said polarization analyzer.

18. The method of fabricating an optical system of claim 17, wherein said isolator is mounted to a base by an adhesive, the first and second rings being disposed to prevent such adhesive from being disposed between said rotator and said polarizer and between said rotator and said polarization analyzer.

* * * * *